United States Patent
Oh et al.

(10) Patent No.: US 10,702,971 B2
(45) Date of Patent: *Jul. 7, 2020

(54) TEXTURED MEMBRANE FOR A MULTI-CHAMBER CARRIER HEAD

(71) Applicant: Applied Materials, Inc., Santa Clara, CA (US)

(72) Inventors: Jeonghoon Oh, San Jose, CA (US); Tsz-Sin Siu, Hong Kong (HK); Hung Chih Chen, Sunnyvale, CA (US); Andrew J. Nagengast, Sunnyvale, CA (US); Steven M. Zuniga, Soquel, CA (US); Thomas B. Brezoczky, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 574 days.

This patent is subject to a terminal disclaimer.

(21) Appl. No.: 15/264,412

(22) Filed: Sep. 13, 2016

(65) Prior Publication Data

US 2017/0001282 A1 Jan. 5, 2017

Related U.S. Application Data

(62) Division of application No. 14/462,303, filed on Aug. 18, 2014, now Pat. No. 9,452,505, which is a division of application No. 13/908,774, filed on Jun. 3, 2013, now Pat. No. 8,808,062, which is a division of application No. 11/614,940, filed on Dec. 21, 2006, now Pat. No. 8,454,413.

(60) Provisional application No. 60/755,742, filed on Dec. 29, 2005.

(51) Int. Cl.
| | |
|---|---|
| *B24B 37/30* | (2012.01) |
| *B24B 41/06* | (2012.01) |
| *B29C 35/02* | (2006.01) |
| *B29C 33/42* | (2006.01) |
| *B29L 31/00* | (2006.01) |
| *B29K 23/00* | (2006.01) |
| *B29K 83/00* | (2006.01) |

(52) U.S. Cl.
CPC ............ *B24B 37/30* (2013.01); *B24B 41/06* (2013.01); *B29C 33/424* (2013.01); *B29C 35/02* (2013.01); *B29K 2023/00* (2013.01); *B29K 2083/00* (2013.01); *B29K 2995/0074* (2013.01); *B29L 2031/755* (2013.01)

(58) Field of Classification Search
CPC ........ B24B 37/30; B24B 41/06; B29C 33/424; B29C 35/02; B29L 2031/755; B29K 2995/0074; B29K 2023/00; B29K 2083/00
See application file for complete search history.

(56) References Cited

U.S. PATENT DOCUMENTS

| | | |
|---|---|---|
| 5,738,574 A | 4/1998 | Tolles et al. |
| 6,390,905 B1 | 5/2002 | Korovin et al. |
| 6,450,868 B1 | 9/2002 | Zuniga et al. |

(Continued)

*Primary Examiner* — Dung Van Nguyen
(74) *Attorney, Agent, or Firm* — Fish & Richardson P.C.

(57) ABSTRACT

A flexible membrane for use in a carrier head has a generally circular main portion with a lower surface, an annular outer portion for connection to a base assembly, and an annular flap extending from the main portion on a side opposite the lower surface for connection to the base assembly. At least one surface of the flap has a surface texture to prevent adhesion.

12 Claims, 2 Drawing Sheets

(56) References Cited

U.S. PATENT DOCUMENTS

| | | | |
|---|---|---|---|
| 6,494,774 | B1 | 12/2002 | Zuniga et al. |
| 6,648,740 | B2 | 11/2003 | Perlov et al. |
| 6,722,965 | B2 | 4/2004 | Zuniga et al. |
| 6,733,965 | B2 | 5/2004 | Echt et al. |
| 6,764,387 | B1 | 7/2004 | Chen |
| 6,855,043 | B1 | 2/2005 | Tang et al. |
| 6,857,945 | B1 | 2/2005 | Chen et al. |
| 6,979,250 | B2 | 12/2005 | Zuniga et al. |
| 7,001,245 | B2 | 2/2006 | Chen |
| 8,454,413 | B2 | 6/2013 | Oh et al. |
| 8,808,062 | B2 * | 8/2014 | Oh .................. B24B 37/30 451/398 |
| 2004/0175951 | A1 | 9/2004 | Chen |
| 2004/0192173 | A1 | 9/2004 | Zuniga et al. |
| 2005/0142993 | A1 | 6/2005 | Chen et al. |
| 2005/0176354 | A1 | 8/2005 | Park et al. |

\* cited by examiner

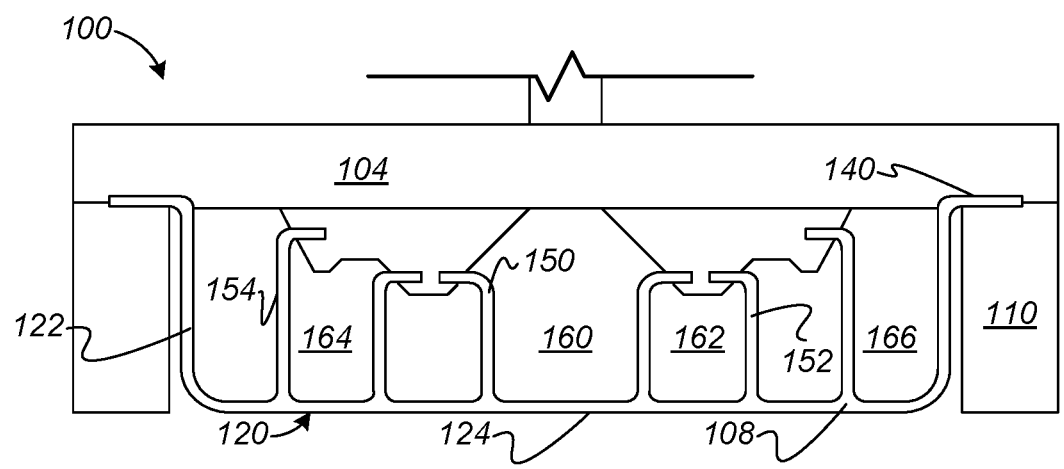
FIG._1
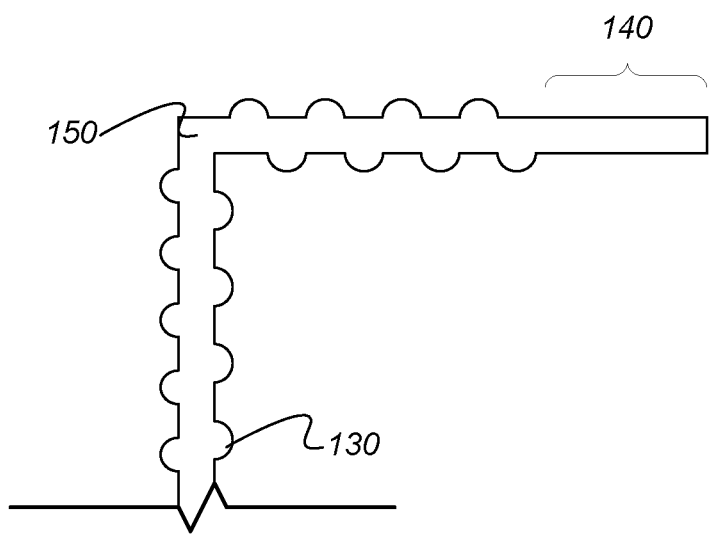
FIG._2

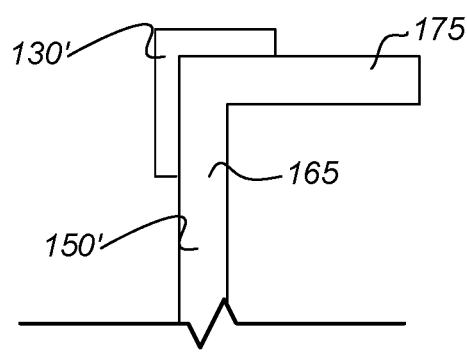
*FIG._3*
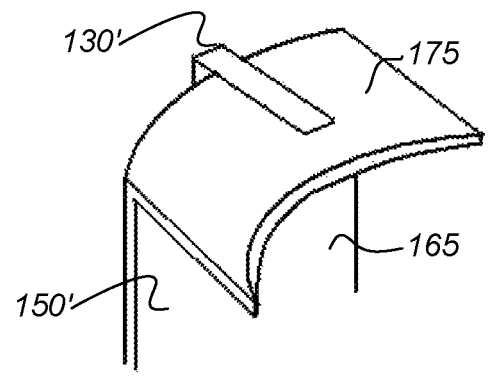
*FIG._4*
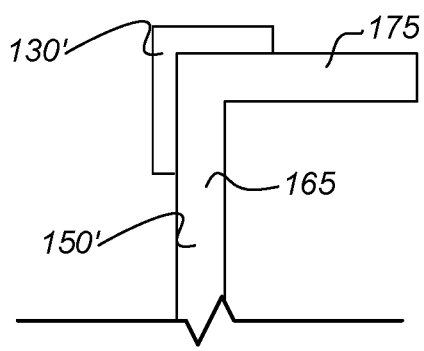
*FIG._5*
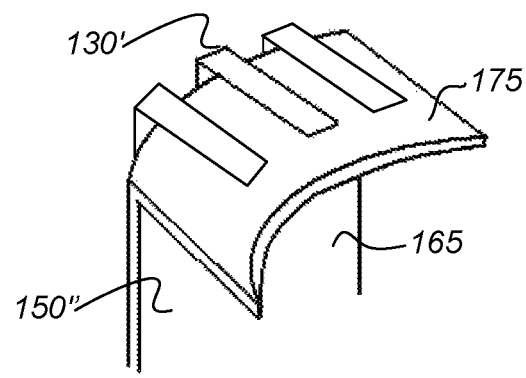
*FIG._6*

TEXTURED MEMBRANE FOR A MULTI-CHAMBER CARRIER HEAD

CROSS-REFERENCE TO RELATED APPLICATIONS

This application is a divisional of U.S. application Ser. No. 14/462,303, filed Aug. 18, 2014, which is a divisional of U.S. application Ser. No. 13/908,774, filed Jun. 3, 2013, which is a divisional of U.S. application Ser. No. 11/614,940, filed Dec. 21, 2006, which claims the benefit of priority of U.S. Provisional Application Ser. No. 60/755,742, filed Dec. 29, 2005. The disclosures of the prior applications are considered part of and is incorporated by reference in the disclosure of this application.

BACKGROUND

The present invention relates to a chemical mechanical polishing carrier head that includes a flexible membrane, and associated methods.

Integrated circuits are typically formed on substrates, particularly silicon wafers, by the sequential deposition of conductive, semiconductive or insulative layers. After each layer is deposited, it is etched to create circuitry features. As a series of layers are sequentially deposited and etched, the outer or uppermost surface of the substrate, i.e., the exposed surface of the substrate, becomes increasingly nonplanar. This nonplanar surface presents problems in the photolithographic steps of the integrated circuit fabrication process. Therefore, there is a need to periodically planarize the substrate surface.

One accepted method of planarization is chemical mechanical polishing (CMP). This planarization method typically requires that the substrate be mounted on a carrier or polishing head. The exposed surface of the substrate is placed against a moving polishing surface, such as a rotating polishing pad. The polishing pad may be either a "standard" polishing pad with a durable roughened surface or a "fixed-abrasive" polishing pad with abrasive particles held in a containment media. The carrier head provides a controllable load to the substrate to push it against the polishing pad. A polishing slurry, including at least one chemically reactive agent, and abrasive particles if a standard pad is used, is supplied to the surface of the polishing pad.

Some carrier heads include a flexible membrane with a mounting surface that receives the substrate. A chamber behind the flexible membrane is pressurized to cause the membrane to expand outwardly and apply the load to the substrate. After polishing, the substrate is chucked to the mounting surface, lifted off the polishing pad, and moved to another location, such as a transfer station or another polishing pad.

SUMMARY

In one aspect, an article for use in a carrier head is described. The article includes a flexible membrane having a generally circular main portion with a lower surface, an annular outer portion for connection to a base assembly, and an annular flap extending from the main portion on a side opposite the lower surface for connection to the base assembly, wherein at least one surface of the flap has a surface texture to prevent adhesion.

In another aspect, a carrier head is described. The carrier head has a base assembly and a flexible membrane. The flexible membrane has a generally circular main portion with a lower surface, an annular outer portion for connection to a base assembly, and an annular flap extending from the main portion on a side opposite the lower surface for connection to the base assembly, wherein at least one surface of the flap has a surface texture to prevent adhesion.

Implementations of the above inventions may include one or more of the following features. A lip portion of the flap can be smoother than a remainder of the flap. An inner surface of the central portion can have the surface texture. The lower surface of the central portion can have the surface texture. The surface texture can be a plurality of protrusions. The protrusions can be at least 30 microinches in height, such as between about 60 and 80 microinches in height, at least 120 microinches or about 0.1 inches in height. The protrusions can be arranged in a regular array or in a random pattern. The protrusions can be elastically compressible. Both surfaces of the flap can have the surface texture. The protrusions can be bar shaped or can have right angles.

In another aspect, the invention is directed to a method of making a flexible membrane for a carrier head. The method includes curing a material in a mold to form the flexible membrane having a flap. The mold has a pattern so that a flap on the flexible membrane has a complementary pattern that includes a plurality of protrusions.

Implementations of the above inventions may include one or more of the following features. The mold can be sand-blasted with sand or glass beads.

Protrusions on the membrane can create channels alongside the protrusions through which fluid is able to pass. Thus, if the membrane folds onto itself or flattens against part of the carrier head, fluid can be pumped through the channel to inflate a chamber defined by the membrane and urge the portions of the membrane away from one another or away from the carrier head. In a similar membrane that is free of protrusions, fluid may not be able to reach the chamber and part of the membrane may stick to itself or to the carrier head. This sticking can prevent desired controlling of substrate polishing. Thus, a membrane with protrusions may enable more reproducible substrate polishing and increase yield.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a cross-sectional view of a carrier head that includes a flexible membrane.

FIG. 2 is an expanded cross-sectional view of the flap of the flexible membrane from FIG. 1.

FIGS. 3-6 are cross-sectional views and perspective views of a portion of a flap of the flexible membrane.

Like reference symbols in the various drawings indicate like elements.

DETAILED DESCRIPTION

As noted above, some carrier heads include a flexible membrane that provides a mounting surface for a substrate during and between polishing operations. In addition, in some carrier heads the flexible membrane includes flaps that provide multiple independently pressurizable chambers. This permits different pressures to be applied to different radial regions of the substrate during polishing. Unfortunately, sometimes a multi-chamber carrier head will not function reliably in response to pressure inputs.

Without being limited to any particular theory, the flaps of the flexible membrane can stick to each other, to the main body of the membrane, or to other parts of the carrier head. This sticking can interfere with proper and reliable function of the carrier head.

The present invention reduces adhesion by reducing the surface contact area between the flaps and other portions of the membrane or carrier head.

FIG. 1 shows a carrier head 100. The carrier head 100 is part of a chemical mechanical polishing (CMP) apparatus that is typically used to polish one or more substrates. The carrier head 100 is operable to hold a substrate, while the substrate is being polished or being transported. A description of a suitable CMP apparatus can be found in U.S. Pat. No. 5,738,574, the entire disclosure of which is incorporated herein by reference.

The carrier head 100 includes a base assembly 104, a retaining ring 110, and a flexible membrane 108. The flexible membrane 108 extends below and is connected to the base 104 to provide a plurality of pressurizable chambers 160, 162, 164, 166. The flexible membrane 108 is operable to hold or release the substrate by changes in a pressure of one or more of the chambers.

Although not illustrated, the carrier head can include other elements, for example, a housing from which the base 104 is movably suspended, a gimbal mechanism (which may be considered part of the base assembly) that permits the base 104 to pivot, a loading chamber between the base 104 and the housing, one or more support structures inside the chamber, or one or more internal membranes that contact the inner surface of the membrane 108 to apply supplemental pressure to the substrate. For example, the carrier head 100 can be constructed as described in U.S. Pat. No. 6,857,945, the entire disclosure of which is incorporated by reference.

The flexible membrane 108 is a generally circular sheet formed of a flexible and elastic material, for example, neoprene, chloroprene, ethylene propylene rubber or silicone. The membrane 108 should be hydrophobic, durable, and chemically inert vis-à-vis the polishing process. The membrane 108 can include a central portion 120 with a lower surface that provides a mounting surface 124 for a substrate, and an annular edge portion 122. In some embodiments, the annular edge portion 122 has extensions that form a lip portion 140 that can be clamped between the retaining ring 110 and the base 104 (as shown in FIG. 1). The lip portion 140 can optionally include a thick rim (not shown), which can help secure the membrane between the retaining ring 110 and the base 104. The central portion 120 can be dimensioned to accept a 200 mm diameter substrate or a 300 mm diameter substrate, e.g., the central portion 120 can be about 200 mm or 300 mm in diameter, or slightly larger than 200 mm or 300 mm so as to accommodate loading of the substrate into the carrier head.

The flexible membrane 108 has one or more flaps 150, 152, 154, extending from the central portion 120, which in part define the chambers. The flaps are mechanically secured to the base assembly 104, e.g., by a clamping assembly. The volume between the base assembly 104 and the membrane 108 that is sealed by the first flap 150 provides a first pressurizable chamber 160. In some flap configurations, the portion of the mounting surface 124 that corresponds to the first pressurizable chamber 160 is circular. The volume between the base assembly 104 and the membrane 108 that is sealed between the first flap 150 and the second flap 152 provides a second pressurizable chamber 162 surrounding the first chamber 160. In some flap configurations, the portion of the mounting surface 124 that corresponds to the first pressurizable chamber 160 is annular. Similarly, the volume between the second flap 152 and the third flap 154 provides a third pressurizable chamber 164. The volume between the third flap 154 and the annular edge portion 122 provides a fourth pressurizable chamber 166. As illustrated, the outermost chamber 166 is the narrowest chamber. In fact, the chambers can be configured to be successively narrower. However, some flapped membranes form equally spaced chambers or chambers that become progressively wider from the center of the membrane to the edge.

Each chamber can be fluidly coupled by passages through the base assembly 104 to an associated pressure source, such as a pump or pressure or vacuum line. This permits different pressures to be applied to different radial regions of the substrate during polishing, thereby compensating for non-uniform polishing rates caused by other factors or for non-uniform thickness of the incoming substrate. Although the carrier head is illustrated with four chamber, the number and configuration of flaps could be adjusted to provide just two or three chambers, or five or more chambers.

The mounting surface 124 of the central portion 120 of the membrane 108 is textured to reduce adhesion between the membrane and the substrate. The texturing can be located just on the side of the membrane that provides the mounting surface, or on both sides of the membrane. The texturing can also extend along the inner and/or the outer surface of the annular edge portion 122 of the membrane 120. The lip portion 140 that is clamped between the retaining ring and base can lack texturing, and thus be smoother than the central portion 120.

In addition, the surfaces of the flaps can be also be textured to reduce adhesion between the flaps and rest of the membrane or the carrier head. Referring to FIG. 2, the surface of the flap 150 is textured with a surface roughness formed by protrusions 130 (in FIG. 2 protrusions 130 are somewhat exaggerated for clarity). The texturing can extend along the entire length of the flap, or can stop at the portion of the flap that would be clamped. The texturing can be on both sides of the flap, or only on the side that is more likely to contact other parts of the carrier head.

The protrusions can be configured to at least partially collapse under pressure. The protrusions can be a variety of possible shapes, such as hemispherical, conical, pyramidal, rectangular or linear, and the protrusions can end in a point or a plateau. If generally linear, the protrusions can be a variety of cross-sectional shapes, such as semicircular, triangular or rectangular. On a single flapped membrane, different protrusions can have different shapes from one another. On some flapped membranes, different protrusions can all be generally pyramidal or hemispherical, but have different dimensions. The protrusions can be uniformly spaced on the membrane.

Referring to FIGS. 3 and 4, in another embodiment, a single protrusion 130' is formed on the flap 150'. This protrusion is a bar type protrusion. In FIGS. 5 and 6, a flap 150" can have multiple protrusions 130'. The protrusion(s) 130', particularly the linear protrusions, can be located at and extend across the connection of the vertical portion 165 to the horizontal portion 175 of the flap. For example, the protrusions 130' can extend radially and be distributed axially symmetrically around a center axis of the membrane.

The protrusions are larger than the "microstructure" texturing that might be present due to inherent roughness properties of the membrane material on the microscale. In general, the protrusions should be sufficiently large that, in the uncompressed state, the flaps cannot achieve 100% surface area contact with other parts of the carrier head. In addition, the protrusions should be sufficiently large that when released from compression, they provide sufficient resilient force that the flap will disengage from the surface that it is contacting.

The protrusions can vary in size considerably. In some implementations, the protrusions can be as small as 10 microinches. In other implementations, the protrusions can be as large as 0.1 inches. In one implementation, the protrusions are less than 200 microinches in height, e.g., less than 160 microinches in height or less than 120 microinches in height. For example, the protrusions can be about 60-80 microinches in height. In some embodiments the protrusions have a length of less than about 100 mils and a width of less than about 0.2 inches. In this context, the average size of the protrusions can be determined by conventional roughness-measuring techniques, e.g., profilometers, that determine the surface roughness dimension $r_a$.

On some membranes, the protrusions all have the same height. On other membranes, the some of the protrusion have different heights from one another. The protrusions can be arranged on the membrane in a regular pattern, for example, a regularly spaced rectangular array, or they can be dispersed randomly.

The protrusions can reduce the tendency of the interior surfaces of the flexible membrane, including the flaps, to stick to each other or to the carrier head, thus improving the reliability of the carrier head.

The surface texture can be created during the molding process, for example, by curing the membrane in a mold that has a complementary pattern. A mold that will impart a random surface texture to the membrane can be prepared, for example, by sandblasting the mold with sand or glass beads.

The described sandblasting produces a mold with a surface roughness on the order of 60-80 microinches. In contrast, it may be noted that the surface microtexture finish F1 as produced from a highly polished steel mold has no defects larger than 10 microinches, whereas the surface microtexture finish F2 has no defects larger than 32 microinches.

Another tactic to reduce adhesion between the membrane and the substrate or other parts of the carrier head, is to limit the amount of bulk viscoelastic extractables, such as plasticizers or antioxidants, in the membrane. Without being limited to any particular theory, these bulk extractables might be able to flow through the membrane surface, creating viscoelastic surface extractables. The viscoelastic surface extractables can then flow between the surface of the membrane and substrate, filling the interstitial volume and increasing the effective contact surface area between the membrane and substrate. Limiting the amount of bulk extractables could reduce the adhesion. For example, if the membrane material is a rubber, the bulk extractables could be limited to less than 7% by weight.

The protrusions can form channels for fluid to pass through. This can allow for fluid to enter or exit chambers formed by the membrane. Because fluid can be pumped into or out through the channels, the chambers can be controllably pressurized or depressurized. Protrusions with square corners, such as right angled corners, may be less likely to conform to other surfaces, such as another portion of the membrane or a part of the carrier head. Thus, squared off protrusions may keep fluid channels open better than other shaped protrusions, such as rounded protrusions.

In addition to forming a membrane that is less likely to seal to itself or to parts of the carrier head when the membrane is collapsed, texture on the flaps or other portions of the membrane that form the interior of the chambers can provide other advantages. Texturing on the backside of the membrane and on the flaps can prevent air pockets from forming when the membrane is collapsed. Air or other fluid is able to escape through channels formed between protrusions that contact a surface when the chambers are evacuated. This can assist in chucking and dechucking procedures between polishing. An potential advantage of a membrane 108 having texture on its outer substrate-mounting surface is that the membrane does not adhere to the surface of the substrate, thereby improving reliability of the unloading procedure.

A number of embodiments of the invention have been described. Different membranes may have texturing only in limited areas, such as on the flaps, or in all areas that could seal to other areas when the chambers are evacuated. In addition to being used on a membrane that is that contacts a substrate during polishing, the texture can be added to a chamber forming membrane that does not contact a substrate during polishing, that is, on an inner membrane of a multi-membrane system, such as the membrane described in U.S. Pat. No. 6,733,965, the entire disclosure of which is incorporated by reference herein. Nevertheless, it will be understood that various modifications may be made without departing from the spirit and scope of the invention. Accordingly, other embodiments are within the scope of the following claims.

What is claimed is:

1. An article for use in a carrier head, comprising:
    a flexible membrane having a generally circular main portion with a lower surface, an annular outer portion for connection to a base assembly, and an annular flap extending from the main portion on a side opposite the lower surface for connection to a base assembly, wherein the flap has a horizontal first portion and second portion extending downwardly from the horizontal first portion to the main portion, wherein the flap has a protrusion projecting from a surface of the flap, and wherein the protrusion extends along the first portion and the second portion and across a connection between the first portion and the second portion.

2. The article of claim 1, wherein the second portion extends vertically.

3. The article of claim 1, wherein the protrusion is substantially linear.

4. The article of claim 3, wherein the protrusion extends radially.

5. The article of claim 1, wherein the flap includes a plurality of protrusions projecting from a surface of the flap.

6. The article of claim 5, wherein the plurality of protrusions have the same height.

7. The article of claim 5, wherein the plurality of protrusions are distributed axially symmetrically around a center axis of the membrane.

8. A flexible membrane for a carrier head of a chemical mechanical polishing system, comprising:
    a generally circular main portion with an upper surface and a lower surface to provide a mounting surface for a substrate;
    an outer annular portion extending upwardly from an outer edge of the main portion, the outer annular portion including a rim to contact and be clamped to the carrier head; and
    an annular flap extending upwardly from the upper surface of the main portion at a position spaced inwardly from the outer edge, the annular flap having an edge portion to contact and be clamped to the carrier head, wherein the membrane includes a flexible and elastic polymer material and a bulk viscoelastic extractable, the bulk viscoelastic extractable comprising no more than 7% of the membrane by weight.

9. The flexible membrane of claim 8, wherein the polymer material includes neoprene, chloroprene, ethylene propylene rubber or silicone.

10. The flexible membrane of claim 8, wherein the bulk viscoelastic extractable includes a plasticizer or an antioxidant.

11. The flexible membrane of claim 8, wherein at least one surface of the annular flap has a surface roughness of 60 to 200 microinches.

12. The flexible membrane of claim 8, wherein the bulk viscoelastic extractables are able to flow through the mounting surface.

* * * * *